H. C. RIDOUT.
MOLD FOR MAKING HEELS, LIFTS, SOLES, OR OTHER ARTICLES FROM RUBBER OR OTHER MATERIAL.
APPLICATION FILED MAR. 5, 1920.
1,383,857.
Patented July 5, 1921.
2 SHEETS—SHEET 1.
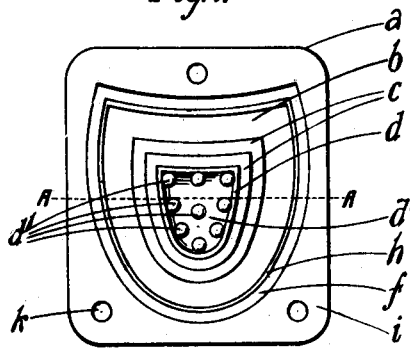
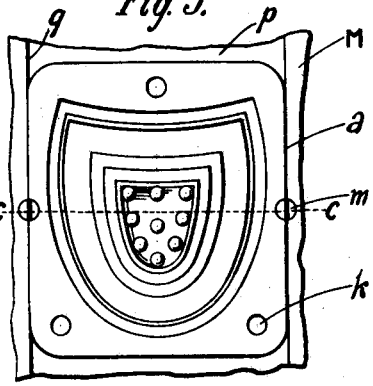
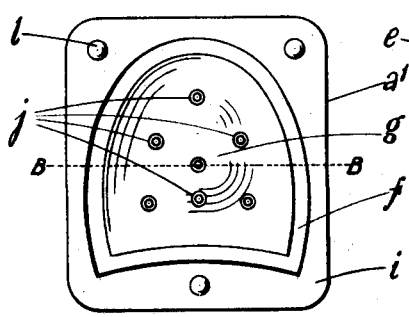
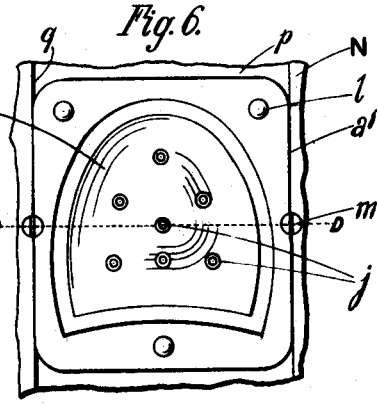
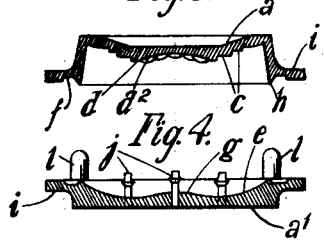
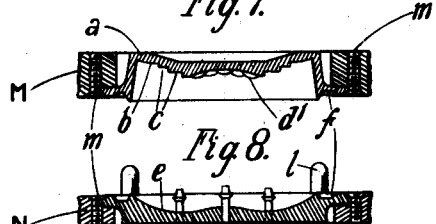
Inventor
Harry C. Ridout
by
Attorney H. C. RIDOUT.
MOLD FOR MAKING HEELS, LIFTS, SOLES, OR OTHER ARTICLES FROM RUBBER OR OTHER MATERIAL.
APPLICATION FILED MAR. 5, 1920.

1,383,857.

Patented July 5, 1921.

Inventor
Harry C. Ridout
by [signature]
Attorney

UNITED STATES PATENT OFFICE.

HARRY CHARLES RIDOUT, OF BOURNEMOUTH, ENGLAND.

MOLD FOR MAKING HEELS, LIFTS, SOLES, OR OTHER ARTICLES FROM RUBBER OR OTHER MATERIAL.

1,383,857.     Specification of Letters Patent.     Patented July 5, 1921.

Application filed March 5, 1920. Serial No. 363,368.

*To all whom it may concern:*

Be it known that I, HARRY CHARLES RIDOUT, a subject of the King of Great Britain, and residing at Bournemouth, Hampshire, England, have invented new and useful Improvements in and Relating to Molds for Making Heels, Lifts, Soles, or other Articles from Rubber or other Material, of which the following is a specification.

This invention consists of improvements in and relating to molds employed in the manufacture of resilient heels, lifts, soles or such other articles as are capable of being produced from resilient or non-resilient material therein.

In manufacturing resilient heels, lifts, soles or similar classes of molded articles (hereinafter for brevity referred to as products) it is usual practice, in view of the great numbers generally required, to employ a multiple or gang mold for this purpose, although a mold unit of the single type can also be employed.

In other types of mold it has been proposed to produce a mold having a base and top plate and in either of these plates, or partly in one and partly in the other the matrix or matrices for giving the desired form to the finished product are machined out from the solid plate or plates. It has been further proposed to construct a mold which is composed of a base, intermediate plate and top plate, or three mold members, each machined from solid material so as to register one with the other and it is in, on, and through these members that the actual matrix, matrices or configuration and shape giving cavity or cavities for the finished product are milled, profiled, machined or hand formed; this cannot be accomplished unless extreme accuracy with considerable skill is exercised, more especially so in the case where a multiple or gang mold of this pattern has to be produced.

When forming the actual matrices in a multiple or gang mold it is necessary (if the obtaining of a uniform product therefrom is desired) that said matrices are each absolute duplicates of one another; and where they are afterward employed to serve in any process of vulcanization it is further necessary that a uniform density and porosity of the material from which they are constructed should be obtained. The foregoing conditions are extremely rare or most difficult of attainment when matrices are formed by machining them out of the solid or by forming them during casting of the material from which they are made, due to the normal variation both as regards density and porosity found to exist in articles so produced, and it is with a view of overcoming these defects and constructing molds with correctly formed and uniformly dense matrices that the present invention has been devised.

One of the objects of this invention is to provide a type of mold member containing or having a matrix or matrices or a part or parts thereof, therein or thereon, produced by the process of die-stamping, pressing, or similar die-forming methods, from sheet or other metal or material, so as to insure and enable the accurate and easy duplication of the configuration or shape of the matrix or matrices part or parts thereof, and in which when it becomes necessary to produce quantities of such mold members the construction is such as to allow and enable said mold member to be employed as a single mold unit, enable said single mold units, which are suitably formed for the purpose, to be readily mounted in holders or container-plates in various multiple or gang forms of placement, or alternatively, the mold member containing numbers of duplicate matrices is constructed with a multiple of matrices in the first instance, and from these matrices the heels, lifts, soles or such articles as may be made from rubber or other material hereinbefore and hereinafter referred to are intended to form the products.

A further object of this invention is to provide a means of construction adapted particularly for use in a multiple or gang mold in which a part of a single matrix or the parts of a comparatively few matrices usually employed as a working-gang are contained in one specially formed demountable, easily renewable, attachable and duplicate mold member unit, for allowing, in the event of injury to any one matrix or the matrices contained in said mold member unit, the easy replacement of such unit, (of which several form a gang) as without such possibility of renewal the whole gang would become practically useless from a producing and output standpoint.

A further object of this invention is to provide a mold designed so as to produce a resilient lift for the heels or soles of boots and shoes, which lift will be a product, having the marginal edges of its upper faces in a single plane and the upper faces of tiers formed therein parallel thereto and in such a manner as to provide a convex and concave shape on both its upper and under faces or a corrugated or waved form on any line of cross-section designed to be fixed flat on the heel or sole of a boot or shoe and formed in its upper concave surface with a number of tiers or steps and a convex or domed-part both or either having small concavities serving as auxiliary suction cups or areas therein which divide the upper surface into a number of independent concave areas, and for the sake of convenience the invention will be described, illustrated and referred to more particularly as employed to produce such a resilient lift as is used on the heels of boots and shoes of the kind and form previously referred to.

Other incidental objects of the invention will appear as the description of the same proceeds.

The invention will now be described with reference to the accompanying drawings, in which:—

Figure 1 is a plan view of the top member of a single type of mold unit in which one part of the matrix is provided, according to this invention.

Fig. 2 is a plan view of the bottom member of a single type of mold unit in which the other part of the matrix is provided, according to this invention.

Fig. 3 is a sectional view taken on the line A—A, Fig. 1.

Fig. 4 is a sectional view taken on the line B—B, Fig. 2.

Fig. 5 is a plan view of the member shown in Fig. 1, as fitted in a portion of a mold container-plate according to this invention.

Fig. 6 is a plan view of the member shown in Fig. 2, as fitted in a portion of a mold container-plate according to this invention.

Fig. 7 is a sectional view taken on the line C—C of Fig. 5.

Fig. 8 is a sectional view taken on the line D—D of Fig. 6.

In the following description the same letters of reference refer to like parts throughout the drawings.

Briefly the invention consists in the method of construction for producing as die-stampings or pressings from sheet or other metal or material, the configuration and shape giving faces, cavity or matrix form in divisible-mold members employed in the manufacture of articles from rubber or other plastic materials, and further during the construction of said mold members, flanges are formed, in or on which registering devices and surplus grooves or channels are provided; said flanges contain the means for holding the mold units together, they are further employed for attaching the mold members when fitted on or into specially formed perforated single or multiple mold container plates which are provided for reinforcing as well as holding the mold members either singly or in a gang form of placement.

Figure 9:
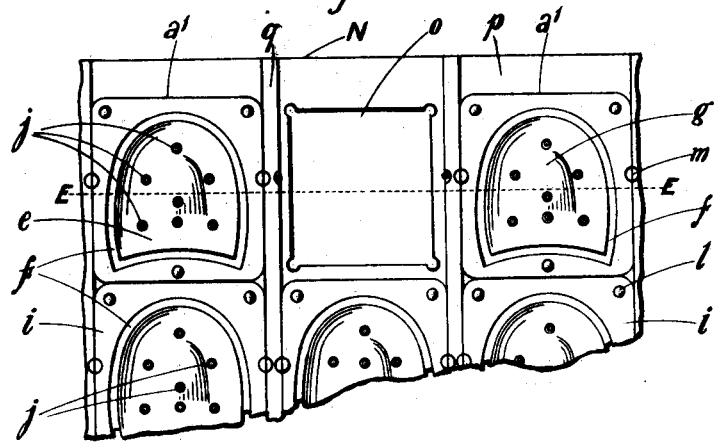
Fig. 9 is a plan view showing a portion of a bottom mold container plate in which a number of the bottom members of the single type of mold shown in Fig. 2, are inserted and arranged in a multiple or gang form of placement, according to this invention.
Figure 10:
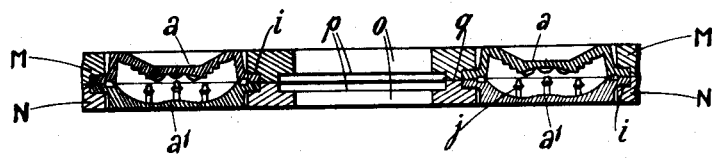
Fig. 10 shows a sectional view taken on the line E—E of Fig. 9, above which in sectional view also is shown in their assembled and adjacent or contiguous position the corresponding top mating members provided in the corresponding top portion of the gang mold.

In carrying out by invention, I employ a complete self contained and self registering divisible mold unit composed of two chief parts, one being the top part ($a$) and the other being the bottom part ($a'$), said complete mold unit is constructed to enable it to be used independently of, or in conjunction with, two specially formed and perforated mold container plates, one being the top container plate (M) and the other being the bottom container plate (N). These plates (M) and (N) are provided to enable the chief parts ($a$) and ($a'$) of the mold units to be correctly mounted in a multiple or gang form of placement, as shown in Figs. 9 and 10, which method of mounting allows a large number of products to be made at one operation.

The top part ($a$) of the divisible mold unit is produced by a process giving absolute interchangeability with others of its kind and is provided in its under surface with a recess or cavity of any desired contour, depth, or size which forms part of the matrix, and when it is employed for making resilient heels of the kind hereinabove referred to it is provided on the closed end of its recess with a convexity ($b$) adjacent to the walls of said recess; said convexity (b) encircles a series of steps or tiers (c) on which, for some types, domed projections (c') are provided to produce concavities in the product. The inner row of steps or tiers (e) encircle a flat portion (d) parallel to the planes of the faces of the tiers (c) which are also parallel to the marginal edge of the recess or cavity, and inside or encircled by said flat portion (d) is provided a concavity ($d^2$) to produce a convex centrally located domed part in the upper surface of the product and on the face of said concavity ($d^2$) domed projections (d') are provided to produce auxiliary concavities in the part of the product formed by ($d^2$). The marginal edge of the matrix recess or cavity of the top mold unit (a) is provided with a marginal knife or edge trimmer (h) which is employed for trimming and cutting away any surplus material during the molding of the product and where the interchangeable complete single mold units are employed, the surplus so removed is accommodated partly in a channel (f) surrounding the knife (h) provided in the flange (i) of the top mold unit (a) and partly in a corresponding channel (f) provided in the flange (i) of the bottom mold unit (a').

Holes (k) are provided in the flange (i) of the top part (a) of the divisible-mold unit, to accommodate registering pegs (l) provided on and secured in the flange (i) of the bottom part (a') of the divisible-mold unit; which holes (k) and pegs (l) cause both the top and bottom matrix part of said mold units to register or aline correctly when one is superimposed in relation to the other.

Screws m are provided for securing the top part (a) and the bottom part (a') of the divisible mold units in either the top container-plate (M) or the bottom container-plate (N) in which container-plate (M) said top part (a) and in which container-plate (N) said bottom part (a') are fitted.

The bottom part (a') of the divisible-mold unit is also produced by a process giving absolute interchangeability with others of its kind, and is provided in its upper surface with a recess or cavity of any desired contour, depth, or size which forms the other part of the matrix, and when it is employed for making resilient heels of the kind hereinbefore referred to it is provided on the closed end of its recess with a concavity or concave channel (e), and adjacent to the marginal edge of said recess or cavity and centrally placed or located therein is provided a convex part (g), employed to produce a centrally placed concavity in the under face of the product.

Figure 12:
Fig. 12 shows a sectional view taken on the line F—F of Fig. 11, below which the sectional view also and adjacent or contiguous thereto is shown the corresponding bottom mating member.

From the closed end of the recess or cavity of the matrix formed in the bottom part (a') of the divisible-mold unit, I provide washer locating pegs (j) having coniform heads, which pegs (j) rise perpendicularly therefrom in relation to the plane of the flange (i) and grouped around or from one peg (j) in the center or shallow part of the recess or cavity and preferably located in its deepest point as shown in Figs. 2, 4, 6, 8, 9 and 10, are other washer locating pegs (j); or alternatively one perpendicular washer locating peg (j) rises centrally placed in the recess as shown in Fig. 12.

Both the top container-plate (M) for the mold unit (a) and the bottom container-plate (N) for the mold unit (a') are provided with perforations (o) for accommodating the said top and bottom mold members; said container plates (M) and (N) are also provided with a step or stepped part (p) for receiving the flanges (i) of the mold units (a) and (a'), they are also provided with ribs (q) for insuring parallelism of the edges and true registering of the mold units (a) and (a') both during and after their assembly therein, in either a single, multiple, or gang form of placement.

Figs. 9 and 10 illustrate clearly perforations from which a single divisible-mold unit has been removed.

Figure 11:
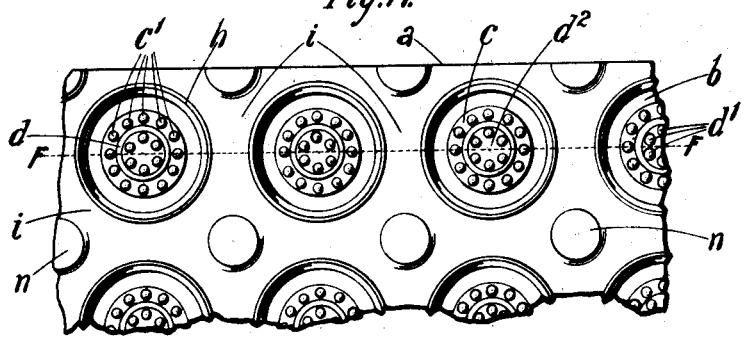
Fig. 11 is a plan view of the top member of a multiple matrix type of mold in which several duplicates of one part of the matrix is provided in the one mold member according to this invention.

In the modification shown in Figs. 11 and 12, which illustrates a multi-matrix type of mold in which several duplicates of the matrix part are contained in the top and bottom mold members, it is possible to dispense with the top and bottom mold container-plates (M) and (N), and when this is done the matrix carrying top and bottom mold units (a) and (a') are formed and provided with projections (n) thereon for taking the pressure during the molding of the product and for regulating the degree of closeness between the top and bottom mold units (a) and (a') when they are in their superimposed and assembled positions.

In the practice of this invention the top mold unit (a) is superimposed in relation to the bottom unit (a') as indicated in Figs. 10 and 12, and in producing rubber or other resilient heels by my improved method, before said top and bottom units (a) and (a') are brought into close proximity one with the other, rubber, composition, or other material from which the product is made is placed in one or both of the cavities forming the matrix proper in a sufficient quantity to completely fill the said cavities or recesses. The mold units (a) and (a') are afterward brought together by means of a hydraulic press or other machine so that the plastic mass in the matrix part of the mold unit will be compressed and solidified and any surplus thereby extruded will be accommodated in the channel or channels (f) as indicated in Figs. 1 to 10, or on the face of the plate (*i*) in the modification indicated in Figs. 11 and 12.

When material for the product is capable of vulcanization the mold units are heated to such an extent as to correctly vulcanize the mass so that it will be rendered very tough and durable, but at the same time will retain its resiliency.

The washer locating pegs (*j*) with coniform heads locate special dished washers which rest upon the coniform part and remain embedded in the product in the process of manufacture.

As previously stated, for the sake of convenience the invention is described, illustrated and referred to more particularly as employed in the production of a resilient lift as is used on the heels of boots and shoes of the kind herein referred to, but it will be obvious that the method of construction of the mold units comprising a complete divisible mold as shown in the illustrations may be employed in the manufacture of products of other kinds, sizes and shapes from rubber or other material without departing from the spirit of the invention.

What I claim is:—

A divisible mold for forming resilient heels or the like, said mold comprising separable members having recesses formed therein produced by stamping from two separate pieces of sheet metal, said depressions forming the matrix proper, said members having laterally projecting flanges, one of said members being provided with a number of steps and a centrally placed concave part having domed projections thereon, the other member having a centrally placed convex part surrounded by a concave portion, washer-locating-pegs rising from said convex and concave parts, apertures formed in one of said flanges and pegs on the other flange adapted to register with said apertures whereby said members are properly positioned.

Dated this tenth day of February 1920.

HARRY CHARLES RIDOUT.

Witnesses:
 FRANK HUMPHRIS,
 ERNST LAPPERT.